US005915089A

United States Patent [19]

Stevens et al.

[11] Patent Number: 5,915,089

[45] Date of Patent: Jun. 22, 1999

[54] SUPPLEMENTAL DATA PROCESSING SYSTEM FOR PROCESSING PLY-MATCHING DATA GENERATED DURING MULTIPLE-PART PRODUCT PRINTING

[75] Inventors: Scott A. Stevens, Downers Grove; Raymond J. Graham, Buffalo Grove, both of Ill.

[73] Assignee: Wallace Computer Services, Inc., Hillside, Ill.

[21] Appl. No.: 08/740,121

[22] Filed: Oct. 24, 1996

Related U.S. Application Data

[63] Continuation-in-part of application No. 08/372,671, Jan. 13, 1995, Pat. No. 5,608,639.

[51] Int. Cl.[6] .................... G06K 15/02

[52] U.S. Cl. .................... 395/200.32; 395/200.54; 395/200.57; 395/200.61

[58] Field of Search .................... 364/469.03, 469.04, 364/478.01, 478.03, 478.07, 478.11–478.16; 270/52.02, 52.04, 52.07, 52.14, 52.15; 395/200.32, 200.49, 200.54, 200.57, 200.61

[56] References Cited

U.S. PATENT DOCUMENTS

| | | | |
|---|---|---|---|
| 3,605,089 | 9/1971 | Gray | 340/172.5 |
| 4,495,582 | 1/1985 | Dessert | 364/469 |
| 5,091,859 | 2/1992 | Zingher | 364/471 |
| 5,322,991 | 6/1994 | Hanson | 235/472 |
| 5,377,337 | 12/1994 | Antognini et al. | 395/375 |
| 5,407,050 | 4/1995 | Takemoto et al. | 194/205 |
| 5,472,309 | 12/1995 | Bernard, II et al. | 414/786 |
| 5,608,639 | 3/1997 | Twardowski | 364/469.04 |
| 5,625,758 | 4/1997 | Schneider | 395/114 |
| 5,625,775 | 4/1997 | Davis | 395/200.12 |

*Primary Examiner*—Thomas R. Peeso
*Attorney, Agent, or Firm*—Roylance, Abrams, Berdo & Goodman, L.L.P.

[57] ABSTRACT

A data processing system is provided which can be connected to an existing ply matching and verification system for multiple-part printed products to perform a number of additional operations external to the matching and verification system. The data processing system is configured to access the data stream generated by the matching and verification system at two data points corresponding, respectively, to after indicia on a ply is detected and before it is stored for matching purposes, and after the indicia on all of the plies of a printed product has been stored in a buffer.

13 Claims, 9 Drawing Sheets

SUPPLEMENTAL DATA PROCESSING SYSTEM FOR PROCESSING PLY-MATCHING DATA GENERATED DURING MULTIPLE-PART PRODUCT PRINTING

This application is a continuation-in-part of U.S. patent application Ser. No. 08/372,671, filed Jan. 13, 1995, U.S. Pat. No. 5,608,639.

FIELD OF THE INVENTION

The present invention relates generally to systems for manufacturing multiple-part printed products, and is particularly concerned with using ply-matching and verification data generated during the assembly of multiple-part printed products to perform a number of other functions.

BACKGROUND OF THE INVENTION

A number of systems exist for ensuring that the plies of a multiple-part printed product match. For example, a ply matching and verification system is disclosed in the U.S. patent application of Twardowski et al, filed on Jan. 13, 1995 and assigned Ser. No. 08/372,671, which is hereby incorporated herein by reference in its entirety for all purposes.

As will be decribed in further detail below, these systems generate data using, for example, a number of bar code scanners or other optical devices such as video cameras to detect indicia on the various plies of a multiple-part printed product (e.g., a business form). The data is subsequently used to determine whether the plies of an assembled multiple-part form match (e.g., the bar codes on each of the plies of a form are read, stored and compared to ensure that they are identical). The sensed data can also relate to detected registration marks, which are printed on the plies for process control.

Existing ply matching and verification systems are limited in that the data generated by their various sensors is used only for process control, that is, for the control of the collators, printers and other components whose synchronized operation is important for the successful assembly of a multiple-part printed product. A need exists for a system which performs a number of other operations concurrently with or subsequent to the assembly of a multiple-part printed product such as imprinting multiple-ply forms with a mark to aide packaging, or activating gates on a sorter to sort forms in accordance with specific carrier routes. Existing ply matching systems do not have the control means for performing these kinds of operations, in addition to providing the process control required to assemble a multi-ply form and to verify that the plies match.

SUMMARY OF THE INVENTION

Additional processing capabilities are provided to an existing ply matching system by a data processing system constructed in accordance with an embodiment of the present invention. The data processing system of the present invention is connected to an existing ply-matching or verification system (hereinafter referred to as a matching/verification system) for multiple-part printed products to perform a number of different external operations. The data processing system is configured to access the data stream generated by the matching/verification system during at least one of a number of process steps performed by the matching/verification system. The data processing system comprises a processing device, a data storage device and an interface device. The interface device connects the processing device to the computer in the matching/verification system. The processing device is programmable to process data from the data stream generated by the indicia sensing devices in the matching/verification system before the sensed data is stored by the computer for matching purposes. The processing device is also programmable to access and process data that has been stored by the computer in one or more of its holding buffers and processed for indicia comparison purposes.

In accordance with another aspect of the invention, the data processing system is configured to access the data stream generated by the matching/verification system directly from the matching/verification system computer. Alternatively, the data processing system is configured to access the data stream generated in the matching/verification system remotely with respect to the matching/verification system computer via a communications link.

In accordance with yet another aspect of the present invention, the computer in the matching/verification system is programmed to initiate communication with the data processing system and to transmit the data stream thereto.

In accordance with still yet another aspect of the present invention, the data processing system is provided with timing signals from the matching/verification system on a read-only basis to control a number of external devices in real-time with respect to the collator in the matching/verification system.

In accordance with another aspect of the present invention, the data processing system is configured to perform a number of different external operations without having to modify the matching/verification system.

BRIEF DESCRIPTION OF THE DRAWINGS

The various advantages and novel features of the present invention will be more readily apprehended from the following detailed description when read in conjunction with the appended drawings, in which.

DETAILED DESCRIPTION OF THE PREFERRED EMBODIMENT

Figure 1:
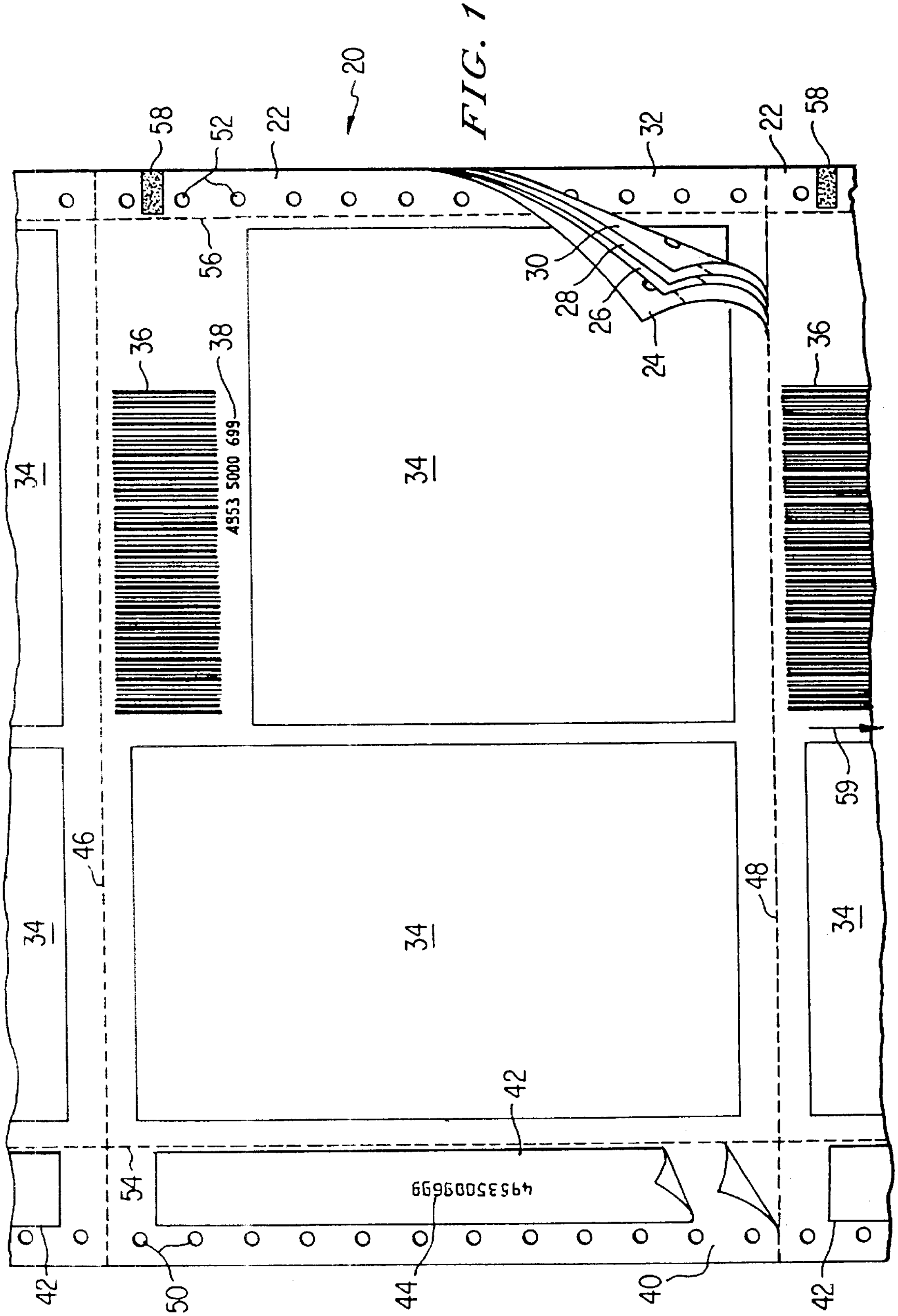
FIG. 1 illustrates a multiple-part printed product.

FIG. 1 illustrates a portion of a connected strip 20 of multiple-ply shipping waybill forms 22 which may be assembled with the aid of an automatic verification or matching system of the type contemplated by the present invention. Each form 22 comprises five main paper plies or layers 24, 26, 28, 30 and 32 which are overlaid on each other and held together by alternating lines of adhesive (not shown) located at or near the left-hand edge of the form 22. The top ply 24, whose printed layout is similar to that of the remaining plies, contains a number of pre-printed blocks or spaces 34 which contain instructions for the user of the form 22 and space for the insertion of information concerning the desired shipment. Each ply is also printed with a tracking number that is unique to each individual form 22 for allowing a lost or delayed shipment to be tracked by the shipping company. In the illustrated embodiment, the tracking number appears as a bar code 36 in the upper right-hand area of the top ply 24, and the same number appears in the form of human-readable digits 38 located just below the bar code 36. It will be understood that each of the remaining plies 26, 28, 30 and 32 contains the same bar code 36 and human-readable digits 38 at the same locations. Thus, when the plies 24–32 are detached from each other during the various stages of a shipment, the tracking number on any given ply will allow the status of the shipment to be monitored.

In addition to the five main plies 24–32, each form 22 includes a sixth ply 40 in the form of a narrow, wax-coated strip 40 that is secured by means of an adhesive along the left-hand edge of the form. The strip 40 serves as a release layer for carrying a pressure-sensitive label 42. The label 42 is imprinted in human-readable digits 44 with the same tracking number represented by the bar code 36 and digits 38. The label 42 is provided for the purpose of allowing a record to be kept of a shipment represented by the form 22 without manually transcribing the tracking number or removing one of the main plies 24–32. For example, delivery personnel can confirm that a shipment has been delivered by peeling off the label 42 and securing it to a delivery list.

The strip 20 in FIG. 1 is separated into individual forms 22 by means of transverse lines of perforations 46 and 48. The strip is also provided with two longitudinal rows of punched holes 50 and 52, one along each lateral edge of the strip, for allowing the plies 24–32 of the strip 20 to be advanced by a standard pin band collator as will be described shortly. The holes 50 and 52 also allow the strip 20 to be loaded into a form-feed printer after finished forms 22 have been produced, in order to print standard or recurring information in the blocks or spaces 34. Carbonless ink technology can be employed to allow information written or typed in the blocks or spaces 34 of the top ply 24 to be duplicated in the corresponding spaces of the lower plies 26–32, or intervening layers of carbon paper (not shown) can be used for this purpose. In addition to the horizontal or transverse lines of perforations 46 and 48, longitudinal lines of perforations 54 and 56 are provided along the edges of the strip 20 to allow the main portions of the plies 24–32 to be separated from the edge portions containing the holes 50 and 52 and release strip 40. The perforations 46, 48, 54 and 56 are preferably formed through all of the plies 24–32 at once after the multiple-ply strip 20 has been assembled by a pin band collator. If individually cut and stacked forms 22 are desired, the transverse perforations 46 and 48 are replaced by cuts formed completely through the plies 24–32 of the strip 20. A registration mark 58, preferably consisting of a small rectangle printed in black ink at the right-hand edge of the top ply 24, is provided to indicate the position of each form 22 on the collator. The registration mark 58 is located at a known distance from the top or leading edge of the form (i.e., from the point where the line of perforations 46 will be formed) in the feed direction of the collator. In the illustrated embodiment, the feed direction is represented by the arrow 59 in FIG. 1.

Figure 2:
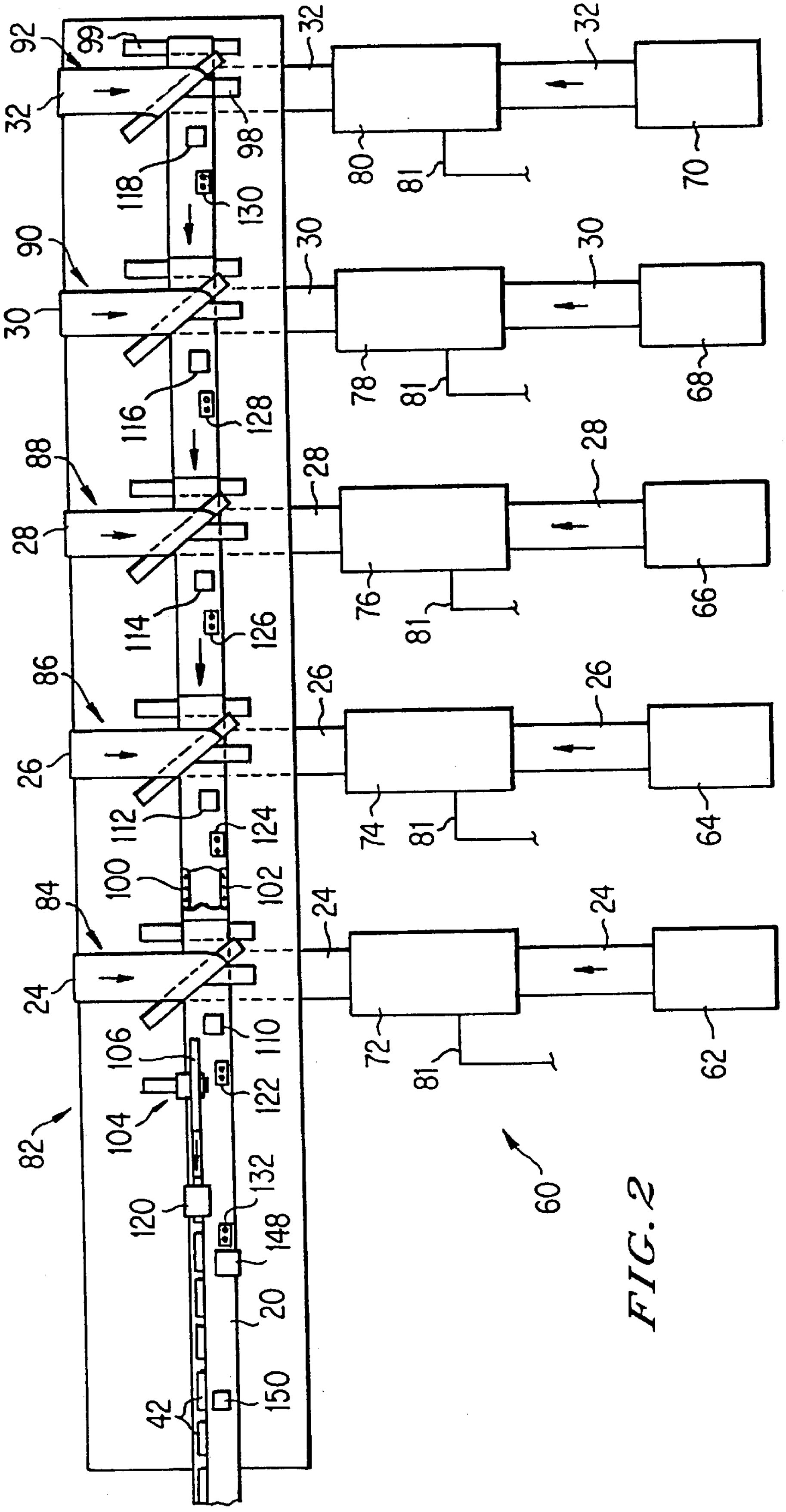
FIG. 2 is a diagrammatic overhead view of a conventional printing and collating system fitted with a matching/verification system for producing and verifying multiple-ply forms of the type illustrated in FIG. 1.

FIG. 2 is a diagrammatic overhead view of a printing and collating system 60 which may be used to produce multiple-ply forms 22 of the type illustrated in FIG. 1. The system 60 includes five unwind stands 62, 64, 66, 68 and 70, one for each of the plies 24, 26, 28, 30 and 32, respectively, of the assembled form 22. Each of the unwind stands 62–70 serves as a mounting fixture for dispensing the corresponding one of the plies 24–32 from a pre-printed roll (not shown). From the unwind stands 62–70, each of the plies 24, 26, 28, 30 and 32 is fed to a corresponding print engine 72, 74, 76, 78 and 80, respectively. The function of the print engines 72–80 is to apply the desired variable indicia (i.e., the bar code 36 and human-readable digits 38) to each of the plies 24–32 at the position shown in FIG. 1. Registration marks (not shown) similar to the registration mark 58 may be provided on each of the plies 24–32 for triggering the print engines 72–80 to print at the proper places on the respective plies. The print engines 72–80 may be of any desired type, but preferably comprise Series 400 or 700 Varypress magnetographic printers manufactured by Nipson Printing Systems of Belfort, France. These devices are controlled by digital inputs on lines 81 from external computers (not shown), and operate by forming latent magnetic images on a metal drum, developing the images with a toner composition, electrostatically transferring the developed toner images to the respective plies 24–32, and heat-fusing the toner images after transfer to the plies. Magnetographic printers have few moving parts and are reliable in operation, and hence they are well suited to high-volume variable printing applications. However, the print engines 72–80 may employ other types of printing technologies with which variable indicia can be printed, such as ion deposition printing, laser printing, ink jet printing and indexed mechanical printing. A suitable ion deposition printer, for example, is the Model 2460, X150 or Presidex 650 print engine manufactured by Delphax Systems of Mississagua, Ontario, Canada. The type of print engine selected will generally be determined by cost constraints and required image resolution, but other types of constraints (such as the need to avoid the pressure fusing step used in ion deposition printers when the plies 24–32 are coated with carbonless ink microcapsules) may require the use of one printing technology in lieu of another.

With continued reference to FIG. 2, the plies 24–32 which emerge from the print engines 72–80, respectively, have been printed with the desired variable information in the form of the bar code 36 and human-readable digits 38 shown in FIG. 1. In this condition, the plies 24–32 are fed to a pin band collator 82 which assembles the plies into a strip 20 of connected multiple-ply forms 22 of the type shown in FIG. 1 by overlaying the plies onto each other and securing them together at one edge with an adhesive. A diagrammatic side view of the collator 82 is provided in FIG. 3. For the most part, the collator 82 is conventional in construction and need not be described in detail. In general, the collator 82 comprises a series of stations 84, 86, 88, 90 and 92 which receive the individual plies 24, 26, 28, 30 and 32, respectively. Taking as an example the upstream station 92 (which receives the lowermost ply 32 from the unwind stand 70), the ply 32 is initially routed beneath the collator 82 and then travels vertically upward to emerge from a slot (not shown) in the side wall of the collator. From the slot, the ply 32 is turned 90° by a turn bar 96 so that it is aligned in the feed direction of the collator 82, and is then fed to the working surface of the collator 82 by means of guide and feed rollers 98 and 99. Additional rollers, which have not been shown for simplicity, assist in guiding the motion of the ply 32 through the collator 82. When the ply 32 reaches the working surface of the collator 82, it is in a face-up orientation (i.e., with the bar code 36 visible) and the holes 50 and 52 along each edge of the ply are engaged by the pin bands 100 and 102 of the collator. As is known, the pin bands 100 and 102 consist of endless metal strips with short, vertically projecting pins for engaging the plies to be assembled. Whenever the collator 82 is in operation, the pin bands 100 and 102 are driven continuously at a uniform velocity and serve as a transport system for conveying the plies 24–32 between successive stations 84–92 of the collator. At the upstream station 92, the lowermost ply 32 of the form 22 is engaged with the pin bands 100 and 102, and at the next station 90 the ply 30 is overlaid onto the ply 32 and engaged with the pin bands. An adhesive applying nozzle (not shown) located between the stations 90 and 92 applies a glue or adhesive to one edge of the lowermost ply 32 before it is overlaid by the next upper ply 30, so that the plies will remain attached once they are brought into contact. This series of events is repeated for each successive downstream station 88, 86 and 84, with the result that the remaining plies 28, 26 and 24 are successively overlaid and bonded to the previous plies to produce the finished multiple-ply strip 22 of FIG. 1.

In order to apply the release strip 40 and labels 42 of FIG. 1 to the combined plies 24–32, the collator 82 of FIG. 2 is provided with a sixth station 104 for dispensing the strip 40 and pre-printed labels 42 from a roll 106. Following application of the release strip 40 to the form strip 20 at the station 104, assembly of the multiple-ply forms 22 is substantially complete except for cutting and perforating. At this point, therefore, the assembled multiple-ply strip 20 is fed to a final processing station (not shown) which forms the longitudinal perforations 54 and 56 of FIG. 1 and divides the strip 20 into individual forms 22. The latter step may consist of forming the transverse perforations 46 and 48 of FIG. 1 if connected forms are desired, or of cutting completely through the strip 20 along the lines 46 and 48 if individually cut and stacked forms are desired.

Figure 3:
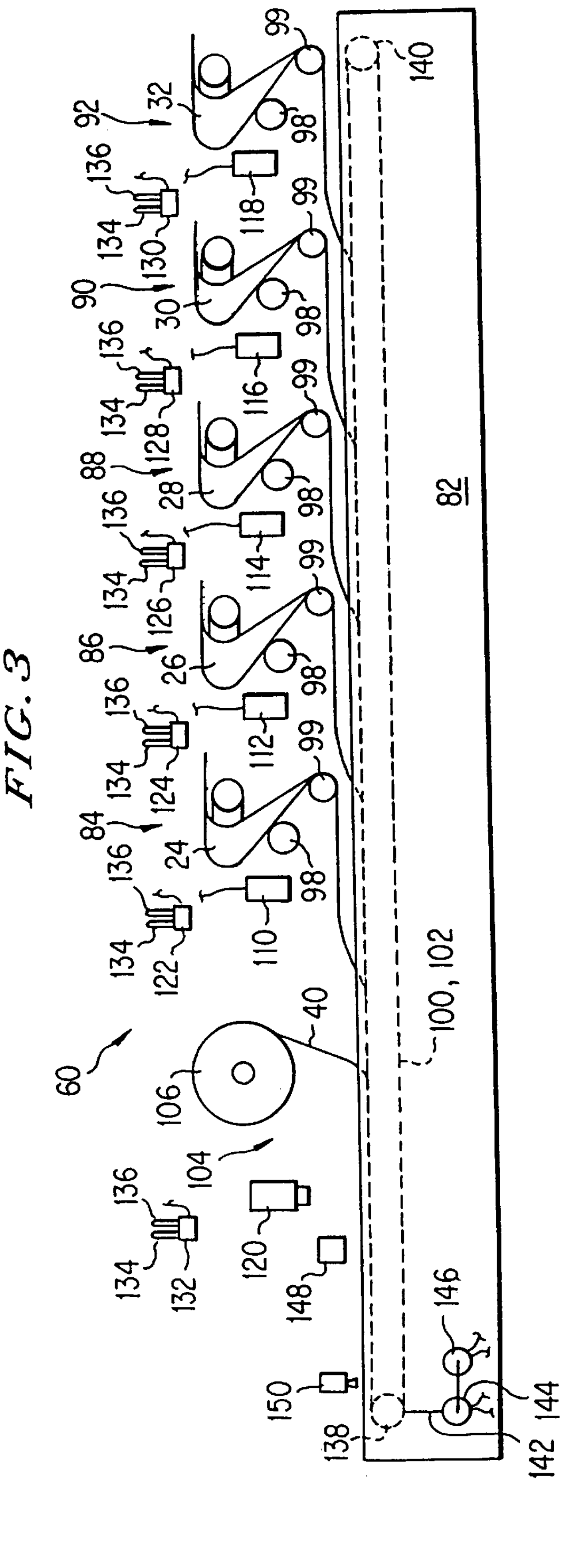
FIG. 3 is a diagrammatic side view of the pin band collator used in the printing and collating system of FIG. 2.

In the operation of the printing and collating system 60 of FIGS. 2 and 3, proper registration must be maintained in order to insure that properly matched plies (i.e., plies bearing the same tracking number at the same form location) arrive at each of the stations 84–90 and 104. In the usual situation where the tracking numbers are printed in a strict numerical sequence, this requires that the print engines 72–80 be operated in synchronism, with an offset in the numbering sequence from one print engine to the next. The amount of this offset will depend upon the relationship between the length of each form 22 in the feed direction and the distance which must be traveled by each ply before joining the succeeding ply. By exercising computer control over the print engines 72–80 in a known manner, the necessary synchronization and offset can be achieved and maintained. However, if synchronization among the print engines 72–80 is lost for some reason, or if proper registration is not maintained among the plies 24–32 and 40 at the collator 82 due to a feed error or other mechanical problem, the strip 20 produced at the downstream end of the collator 82 will consist of mismatched plies and will be useless for its intended purpose.

A ply matching error resulting from these and other causes can be quickly detected and corrected by providing the collator 82 with a plurality of indicia sensing devices, one located at each of the stations 84–92 and 104. In the illustrated embodiment, the indicia sensing devices provided at the stations 84, 86, 88, 90 and 92 comprise bar code scanners 110, 112, 114, 116 and 118, respectively. Each of the bar code scanners 110–118 is positioned above one of the plies 24–32 so that it can scan the bar codes 36 on that particular ply before the ply is overlaid by the ply introduced at the next station. In the case of the final station 104, the indicia sensing device comprises a video camera 120 rather than a bar code scanner. The video camera is positioned above the strip 20 of assembled plies near the edge at which the release strip 40 has been applied, so that the human-readable digits 44 on the labels 42 are within the field of view of the camera. A control system (not shown in FIGS. 2 and 3) is connected to the bar code scanners 112–118 and video camera 120 in order to trigger the operation of these imaging devices at the proper times, and to store their outputs for verification or matching purposes. As part of the verification or matching function, the control system produces outputs which operate visual indicators 122, 124, 126, 128, 130 and 132 located at the respective stations 84, 86, 88, 90, 92 and 104. In the preferred embodiment, each visual indicator comprises a pair of incandescent lamps 134 and 136 with red and yellow lenses, respectively. Illumination of the red lamp 134 by the control system indicates that a matching or sequence error has occurred at the corresponding station, while illumination of the yellow lamp 136 indicates that the indicia being read at the station (i.e., a bar codes 36 or the human-readable digits 44) is either of poor quality or completely unreadable. By providing these indications at each of the stations 84–92 and 104, the source of a matching or sequence error is quickly made apparent to the collator operator. Moreover, by providing an indication of poor quality or unreadable indicia at each station, in addition to an indication of a matching or sequence error per se, the operator can be provided with early warning of conditions which may require attention. For example, toner clumps in the print engines 72–80 of FIG. 2 may result in bar codes 36 which, while scannable, give the final product a poor appearance. This situation will not necessarily result in a matching or sequence error, but the illumination of the yellow warning lamp 136 will alert the operator to the problem so that any necessary corrections can be made.

With continued reference to FIG. 3, the pin bands 100 and 102 are mounted on pulleys 138 and 140 located at either end of the collator 82. The pulleys are driven by a shaft 142 which forms a part of the drive system (not shown) for the collator 82. In order to provide synchronization for the bar code scanners 110–118 and video camera 120, the shaft 142 is coupled to an angular resolver 144 and also to a shaft encoder 146. As will be described shortly, the resolver 144 allows the control system to produce appropriate synchronization signals for the bar code scanners 110–118, while the encoder 146 allows the control system to produce synchronization signals for the video camera 120. The resolver 144 and encoder 146 serve as motion sensors for detecting the velocity and displacement of the pin bands 100 and 102, and hence of the individual webs or plies 24–32 and 40 carried by the collator 82. Proper synchronization also requires that the precise position of each form 22 be known as it advances through a given one of the stations 84–92 and 104. This is achieved by means of a photoelectric detector 148, which is mounted near the downstream or output end of the collator 82 and positioned to detect the registration marks 58 on the edges of the form strip 20. Since the plies 24–32 and 40 are continuous and the registration marks 58 are spaced apart by a known and fixed distance, the detection of the registration marks by a single photoelectric detector 148 at a known location provides an indication of the relative position of each form 22 at the respective stations 84–92 and 104. This information, together with the information provided by the resolver 144 and encoder 146, allows the bar code scanners 110–118 and video camera 120 to be triggered at the proper times.

A solenoid-controlled spray unit 150 is located at the downstream end of the collator 82. The purpose of the spray unit 150 is to deposit a red dye on forms 22 with mismatched plies or other defects, before the forms 22 are perforated or cut by the final processing station 108. The spray unit 150 is actuated by the control system whenever a matching or sequence error occurs (i.e., whenever the red error lamp 134 is illuminated at one or more of the stations 84–92 and 104). This allows defective forms to be accurately identified and discarded after an error has occurred, without the need to discard forms which may not in fact contain errors. Another advantage of the spray unit 150 is that it allows for the possibility of correcting matching or sequence errors without stopping the collator 82 to remove the defective portion of the strip 20, since the defective products can easily be identified later on after the error has been corrected. Correction of matching or sequence errors "on the fly" may result in a greater number of defective forms being produced, but this may be a less serious consequence than the down time that results when the collator 82 must be stopped and restarted.

Figure 4:
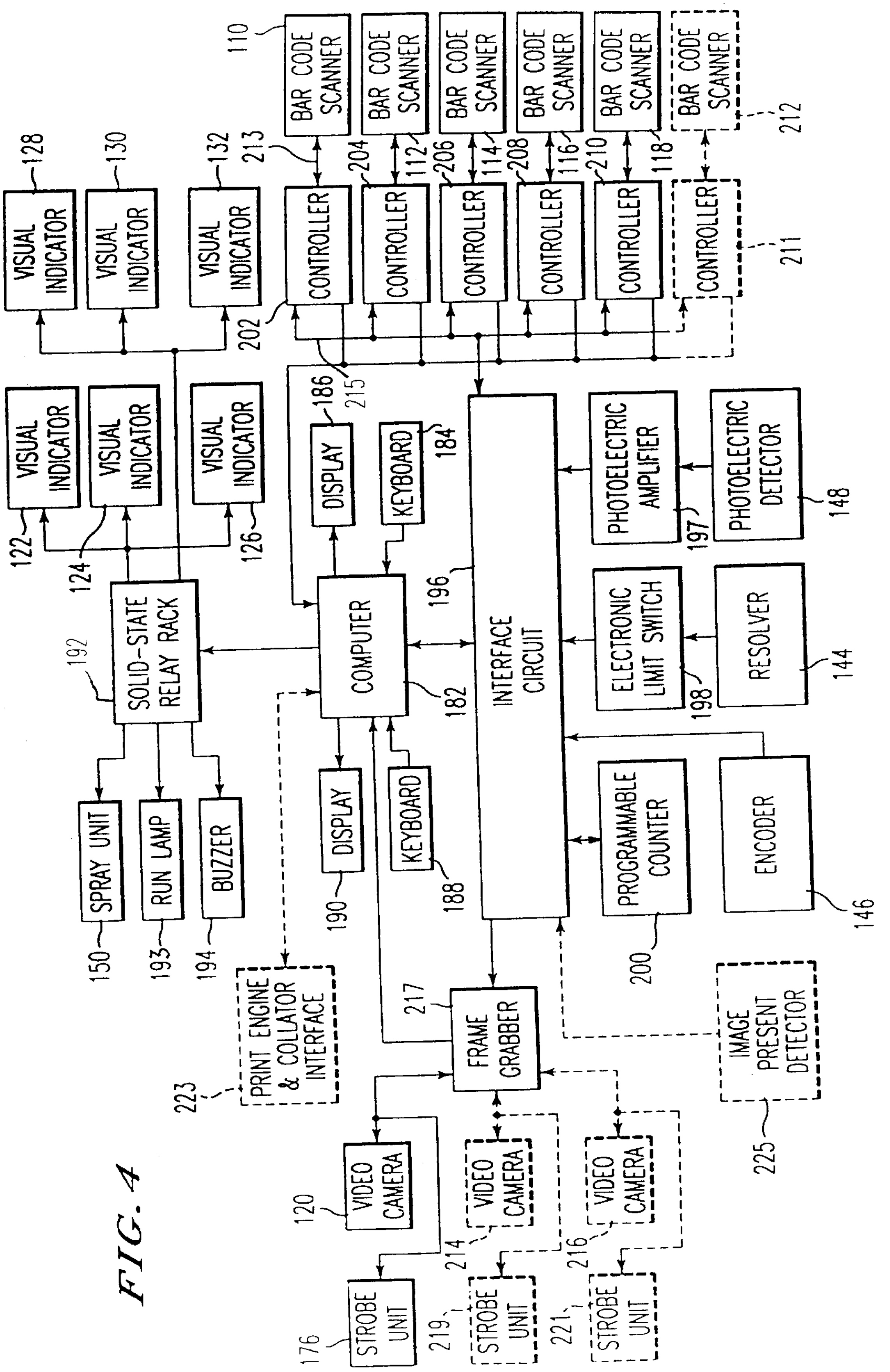
FIG. 4 is a block diagram of the principal electrical components of the matching/verification system depicted in FIG. 2.

FIG. 4 is a block diagram of the principal electrical components of the verification or matching system in accordance with a preferred embodiment of the present invention. Except for the bar code scanners and other components already described as being mounted on the collator 82, most of the components shown in FIG. 4 are housed in a remote cabinet which is connected to the collator 82 by means of appropriate cables. Overall system control is provided by an industrial computer 182, which may comprise a Series 5000 rack mount computer manufactured by Cormark Corporation of Medfield, Mass. and equipped with an Intel 486 or 586 processor operating at 66 MHz. The computer 182 is connected to a keyboard 184 and video display terminal 186, which are preferably located in the remote cabinet to allow an operator to perform initial set-up operations and to monitor system status and error conditions. A second keyboard 188 and video display terminal 190 are located outside the cabinet at a point on or near the collator 82, so that they are conveniently accessible to the collator operator. Outputs from the computer 182 are connected to a rack 192 of solid state relays which operate certain components mounted on the collator 82. These include the visual indicators 122–132, the spray unit 150, a run lamp 192 which is illuminated whenever the system is in operation, and a buzzer 194 which alerts the collator operator in the event that a matching or sequence error is detected. The computer 182 is also connected to an interface circuit 196 which receives inputs from the computer 182, from the encoder 146 of FIG. 3, and also from the photoelectric detector 148 of FIG. 3 via a photoelectric amplifier 196. The interface circuit 196 receives additional inputs from a multiple-channel electronic limit switch 198 which is connected to the resolver 144 of FIG. 3, and from a programmable counter 200 which operates in conjunction with the encoder 146. In the preferred embodiment, the electronic limit switch 198 comprises a Model M1051 PLS 16-channel device manufactured by Autotech Controls of Carol Stream, Ill., and the programmable counter 200 comprises a Max Position 1 4-channel unit manufactured by Danacher Controls of Gurnee, Ill. One output channel of the electronic limit switch 198 is used for each of the bar code scanners connected to the system, and one output channel of the programmable counter 200 is used for each video camera.

Outputs from the interface circuit 196 are connected to five bar code scanner control units 202, 204, 206, 208 and 210, one corresponding to each of the bar code scanners 110, 112, 114, 116 and 118 of FIG. 3. Provision is also made for connecting a sixth control unit 211 to the interface circuitry 196 in order to accommodate a sixth bar code scanner 212, in case an additional scanner is needed in certain applications. Each control unit 202–211 is connected to its respective bar code scanner by means of a cable 213 extending between the remote cabinet and the collator 82, and functions both to control the operation of the scanner and to decode the scanner output data. In a preferred embodiment, the bar code scanners 110–118 and 212 comprise Scanstar Model 10 laser diode scanners manufactured by Computer Identics Corporation of Canton, Mass., and the control units 202–211 comprise Scanstar Model 242i decoders manufactured by the same company. The bar code data decoded by the control units 202–211 is applied as input data to the computer 182 via lines 215 as shown in FIG. 4.

The interface circuit 196 of FIG. 4 also provides trigger signals for the video camera 120. Although only one video camera 120 is employed in the arrangement shown in FIGS. 2 and 3, the interface circuitry preferably provides outputs for two additional video cameras 214 and 216. The video cameras 120, 214 and 216 may be of any desired type, but preferably comprise charge-coupled device (CCD) array cameras with either one or two dimensional CD arrays. In the preferred embodiment, the video cameras 120, 214 and 216 comprise Model TI-324A two dimensional CCD array cameras manufactured by NEC America, Inc. of Irving, Tex., with type 05 modifications to interlace the two scan fields and thereby improve image resolution at high web speeds. The video cameras 120, 214 and 216 are connected to the computer 182 and to the interface circuit 196 by means of a frame grabber board 217, which preferably comprises a Data Raptor VL data acquisition board manufactured by BitFlow, Inc. of Woburn, Mass. In addition to providing control for the video cameras 120, 214 and 216 and transmitting image data to the computer 182, the frame grabber board 217 also triggers the strobe light unit 176 for the video camera 120 and similar strobe light units 219 and 221 for the video cameras 214 and 216, respectively. Although shown as a separate component in FIG. 4, the frame grabber board will normally be provided as a plug-in board within the computer 182. The computer 182 also includes suitable optical character recognition (OCR) hardware and software for processing images produced at the camera outputs and received by the frame grabber board 217. An example of a suitable OCR hardware/software package is the Textpert system available from CTA Corporation of New Haven, Conn., which is capable of processing up to 40,000 alphanumeric characters per minute. This is more than sufficient for recognizing the characters 44 in the labels 42 of FIG. 1 at the web speeds contemplated by the present invention. It will be understood that the computer 182 also includes suitable memory for storing the programming required for the operation of the verification system, input/output boards for establishing connections to the solid state relay rack 192 and interface circuit 196, and communication ports for receiving data from the bar code scanner control units 202–212 and video cameras 120, 214 and 216. These components are conventional and have been omitted from FIG. 4 in the interest of simplicity.

Also shown in FIG. 4 is an optional print engine and collator interface 223 which is connected to the computer 182. In instances where it is desired to resequence the print engines 72–80 automatically after a matching or sequence error has been detected, the print engine and collator interface 223 allows the collator 82 to be placed in a jog mode while the necessary correction data is sent to the computers (not shown) which control the print engines 72–80. Another optional component that is shown in FIG. 4 is an image present sensor 225, which may be connected to the interface circuit 196 (or, in some cases, directly to the computer 182). The image present sensor 225 may be mounted at one or more of the collator stations 84–92 and 104 to determine whether an image (e.g., a bar code 36 or digits 44) is present at a predetermined position in the form strip 20, without actually scanning or decoding the image. The image present sensor 25 is useful in instances where the detection of a blank or unprinted form ply (i.e., a ply which has not been printed with any variable information) is all that is needed at a particular collator station. For this purpose, the image present sensor may consist of a photoelectric detector and amplifier similar to the components 148 and 196, appropriately calibrated to detect the presence or absence of a printed image on the form strip 20.

The control system for the system 60 comprises the bar code scanners and other components already described as being mounted on the collator 82, as well as a number of other components housed in a remote cabinet that is connected to the collator by means of appropriate cables. The components in the remote cabinet comprise an industrial computer 182 for providing overall system control. The computer may comprise a Series 5000 rack mount computer manufactured by Cormark Corporation of Medfield, Mass. and equiped with an Intel 486 or 586 processor operating at 66 MHz. Outputs from the computer are connected to a rack 192 of solid state relays which operate certain components mounted on the collator 82. These include the visial indicators 122–132, the spray unit 150, a run lamp 192 which is illuminated whenever the system is in operation, and a buzzer 194 which alerts a collator human operator in the event that a matching or sequence error is detected.

The computer is also connected to an interface circuit 196, which receives inputs from the computer 182, the encoder 146 of FIG. 3, and also from the photoelectric detector 148 of FIG. 3 via a photoelectric amplifier 197. The interface circuit 196 receives additional inputs from a multiple-channel electronic limit switch 198 which is connected to the resolver 144 of FIG. 3, and from a programmable counter 200 which operates in conjunction with the encoder 146. The electronic limit switch 198 can be a Model M1051 PLS 16-channel device manufactured by Autotech Controls of Carol Stream, Ill., and the programmable counter 200 compirses a Max Position 1 4-channel unit manufactured by Danacher Controls of Gurnee, Ill. One output channel of the electronic limit switch 198 is used for each of the bar code scanners connected to the system, and one output channel of the programmable counter 200 is used for each video camera.

Outputs from the interface circuit 196 are connected to five bar code scanner control units 202, 204, 206, 208 and 210, one corresponding to each of the bar code scanners 110, 112, 114, 116 and 118 of FIG. 3. Provision is also made for connecting a sixth control unit 211 to the interface circuitry 196 in order to accommodate a sixth bar code scanner 212, in case an additional scanner is needed in certain applications. Each control unit 202–211 is connected to its respective bar code scanner means by a cable 213 extending between the remote cabinet and the collator 82, and functions both to control the operation of the scanner and to decode the scanner output data. The bar code data decoded by the control units 202–211 is applied as input data to the computer 182 via lines 215 as shown FIG. 4.

The interface circuit 196 also provides trigger signals for the video camera 120. The video camera 120 is connected to the interface circuit 196 by a frame grabber board 217. In addition to providing control for the video camera 120, the frame grabber board 217 triggers a strobe light unit 176 for the video camera 210. The frame grabber board 217 is preferably provided as a plug-in board within the computer 182.

The computer 182 includes suitable optical character recognition (OCR) hardware and software for processing images produced at the camera outputs and received by the frame grabber board 217. It will be understood that the computer 182 also includes suitable memory for storing the programming required for the operation of the matching and verification system 60, input/ouput boards for establishing connections to the sold relay rack 192 and interface circuit 196, and communication ports for receiving data from the bar code scanner control units 202–212 and video camera 120.

As stated previously, the matching/verification system 60 comprises a plurality of indicia sensing devices such as video cameras and bar code scanners for a plurality of stations in a collator to sense indicia on different parts of a multiple-part printed product. A computer 182 is connected to the indicia sensing devices to store the outputs of the indicia sensing devices until the indicia for all parts of the printed product has been sensed. The sensed indicia data is stored and compared to determine whether the printed product has been properly assembled. The computer 182 can modify the operation of the printing devices (e.g., the transport system that advancess a web through the collator) in the event that the comparison operation indicates that the product has not been assembled correctly.

Existing matching/verification systems for multiple-part printed products, however, are not designed to perform additional functions such as performing quality control checks or generating audit trails as requested by a customer, or printing special marks on every predetermined number of pieces for packaging purposes, or controlling automatic sorters or printers of package labels to facilitate operations in the manufacturing plants. In accordance with an embodiment of the present invention, a data processing system 222 is configured and programmed to use the data stream generated in a matching/verification system 60 to perform additional, desired functions.

Figure 5:
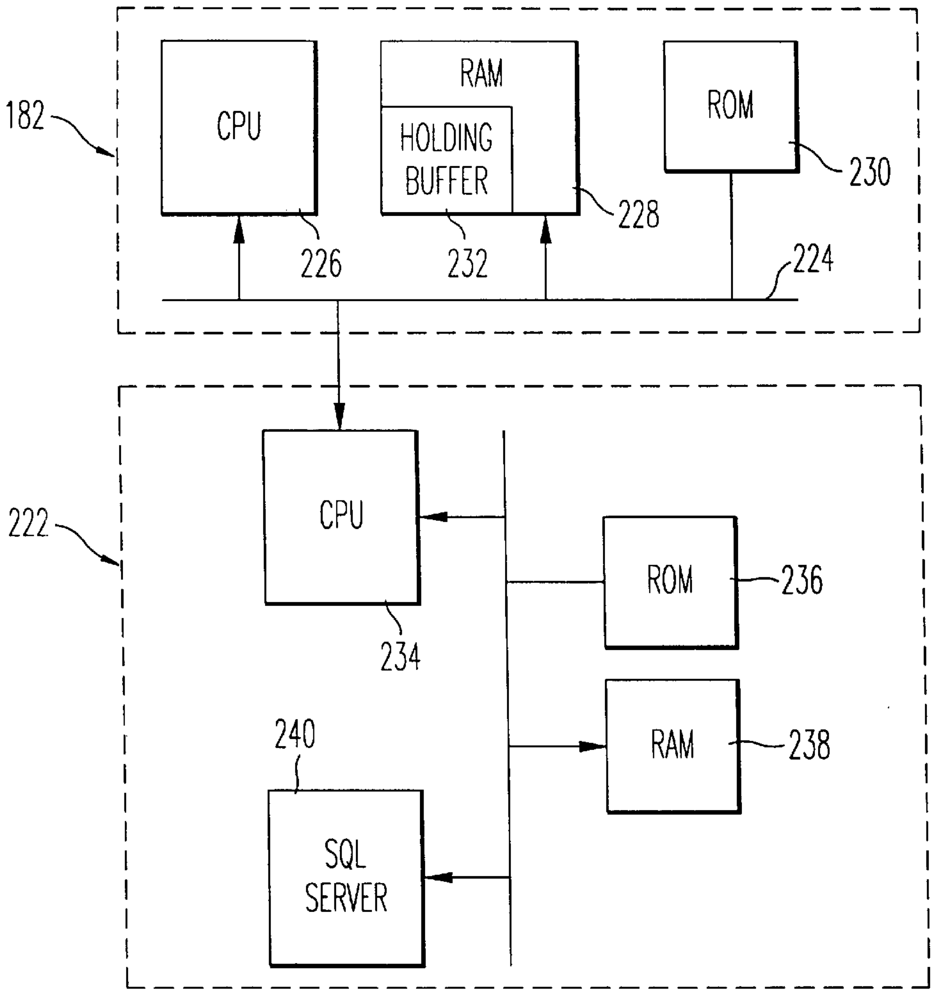
FIG. 5 is a block diagram of a data processing system constructed in accordance with an embodiment of the present invention and is connected directly to the computer bus of a matching/verification system.

In accordance with the embodiment illustrated in FIG. 5, the data processing system 222 can be connected directly to the computer bus 224 of the computer 182 controlling the exemplary matching/verification system 60. The computer 182 comprises a central processing unit (CPU) or mother board 226, a random access memory (RAM) 228, and a read-only memory (ROM) 230 connected via the bus 224. The computer 182 is programmed to store data from each of the indicia sensing devices in a holding buffer 232 in the RAM 188 or other memory device (not shown) at least until all of the the indicia sensing devices have sensed their respective indicia for the product currently being assembled, and the stored indicia data has been compared to detect mismatches or other errors in the indicia on the plies of the product. The holding buffer 232 preferably comprises dually-linked first-in-first-out (FIFO) memory buffers for each bar code scanner 110–118, video camera 120 or other indicia sensing device in use.

The data processing system (DPS) 222 comprises a CPU or mother board 234 which preferably employs the same microcontroller as the CPU 226 in the computer 182. The DPS 222 and the computer 182 are each programmed using, for example, C++ program code; however, other program compilers can be used. The operating system for the CPUs 226 and 234 is preferably a real-time, multi-tasking kernel such as the FileApp DOS Extender. The DPS 222 also comprises a ROM 236, a RAM 238 and a database search engine 240. The database search engine is preferably a Structured Query Language server on, for example, a local mainframe such as the IBM minicomputer model AS/400 or accessed via a local area network (LAN).

In accordance with the embodiment of the present invention depicted in FIG. 5, the CPUs 226 and 234 communicate with each other via the bus 224 on the conventional common backplane of the computer 182. The backplane of the computer 182 is preferably a standard passive backplane for personal conputers, as opposed to a hard-wired backplane. The passive backplane allows for a pluralty of processors (e.g., the CPUs 226 and 234) to communicate with each other by assigning port addresses to the processors in a conventional manner via switches (not shown) on the CPU or motherboard 226 of the computer 182.

The manner in which the computer 182 and DPS 222 communicate will now be described. The additional processing functions performed by the DPS 222 and the timing for communicating with the computer 182 during process control of the matching/verification system 60 is described below in connection with FIGS. 7, 8 and 9. A configuration file is programmed and provided to the computer 182 for storage in its RAM 228, for example. The configuration file provides the computer 182 with the port address of the DPS 222. The DPS 222 is similarly provided with a configuration file identifying those devices for which the DPS 222 is registered to provide services. A DPS 222 can serve more than one computer 182, although preferably not simultaneously, and can provide different services. A DPS 222 can therefore be programmed with the addresses of a number of different computers.

In accordance with the present invention, the computer 182 initiates a call to the DPS 222 via port input/output and interrupt routines at selected times during process control of the matching/verification system 60. If the CPU 234 of the DPS 222 recognizes the port address of the calling CPU 226, then the CPU 234 is programmed to send a response signal to the CPU 226 to confirm that a communication link is established. Similarly, the CPU 226 can transmit a signal to the CPU 234 to terminate the communication link which is acknowledged by a return signal transmitted by the CPU 234.

Figure 6:
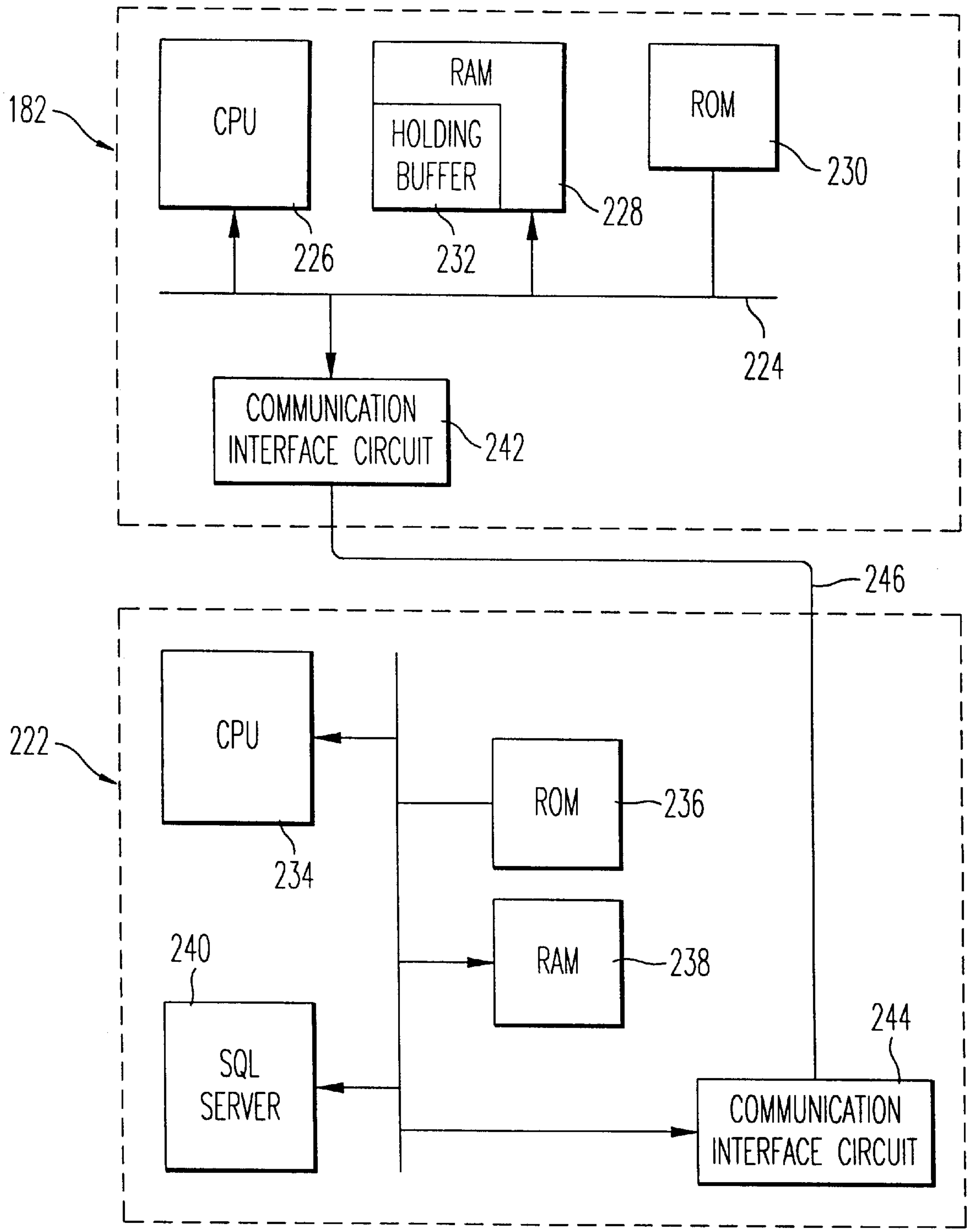
FIG. 6 is a block diagram of a data processing system constructed in accordance with an embodiment of the present invention and connected to a matching/verification system via a communication link.

In accordance with another embodiment of the present invention, the DPS 222 can be connected to the computer 182 via a communication link, as shown in FIG. 6. The communication link can be an ultrasound link, a fiber optic link, a hard-wired telecommunications link, or a radio frequency signal link (e.g., a microwave link or an infrared link), among others. The computer 182 comprises a communication interface circuit 242 for establishing a serial communication link 246 (e.g., a LAN) to a remote DPS 222. The remote DPS 222 is provided with a similar communication interface circuit 244. The communication interface circuits 242 and 244 can be, for example, InTel EtherExpress Pro network boards which are connected to the CPUs 226 and 234, respectively, in a conventional manner.

With continued reference to FIG. 6, the computer 182 and the DPS 222 are programmed to establish a communication link in a manner similar to that described with reference to FIG. 5. The computer 182 is programmed in accordance with a configuration file to initiate a call to the DPS 222 via a serial port on its communication interface circuit 242 at selected times during process control of the matching/verification system 60. The configuration file provides the CPU 226 with the network address of the DPS 222. The communication interface circuit 244 is configured to notify the CPU 234 of an incoming call. If the CPU 234 of the DPS 222 recognizes the network address of the calling CPU 226, then the CPU 234 is programmed to send a response signal to the CPU 226 via a serial port on the communication interface circuit 244 to confirm that a communication link is established. Similarly, the CPU 226 can transmit a signal to the CPU 234 to terminate the communication link which is acknowledged by a return signal transmitted by the CPU 234.

Figure 7:
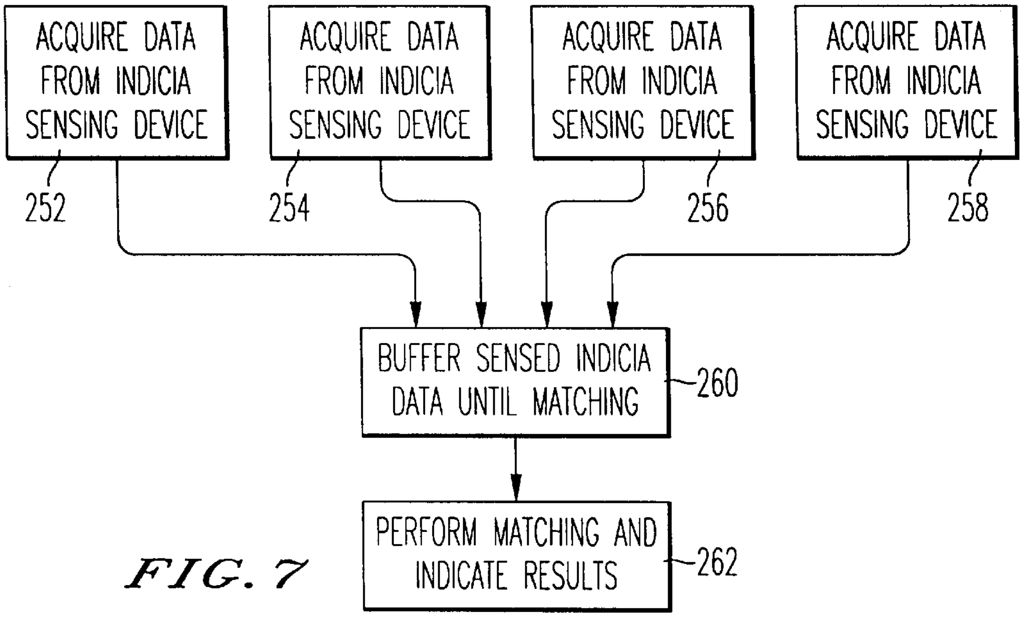
FIG. 7 is a block diagram illustrating the data stream generated in the matching verification system depicted in FIG. 2.

In accordance with the present invention, the DPS 222 has the capability of accessing the data stream generated by the matching/verification system 60 at preferably two points during process control of the system 60. The data stream generated in a conventional matching/verification system 60 is depicted in FIG. 7. The two points 248 and 250 (hereinafter referred to as data taps 248 and 250) are illustrated in FIG. 8 which depicts a matching/verification system 60 operating in conjunction with a data processing system 222.

Figure 8:
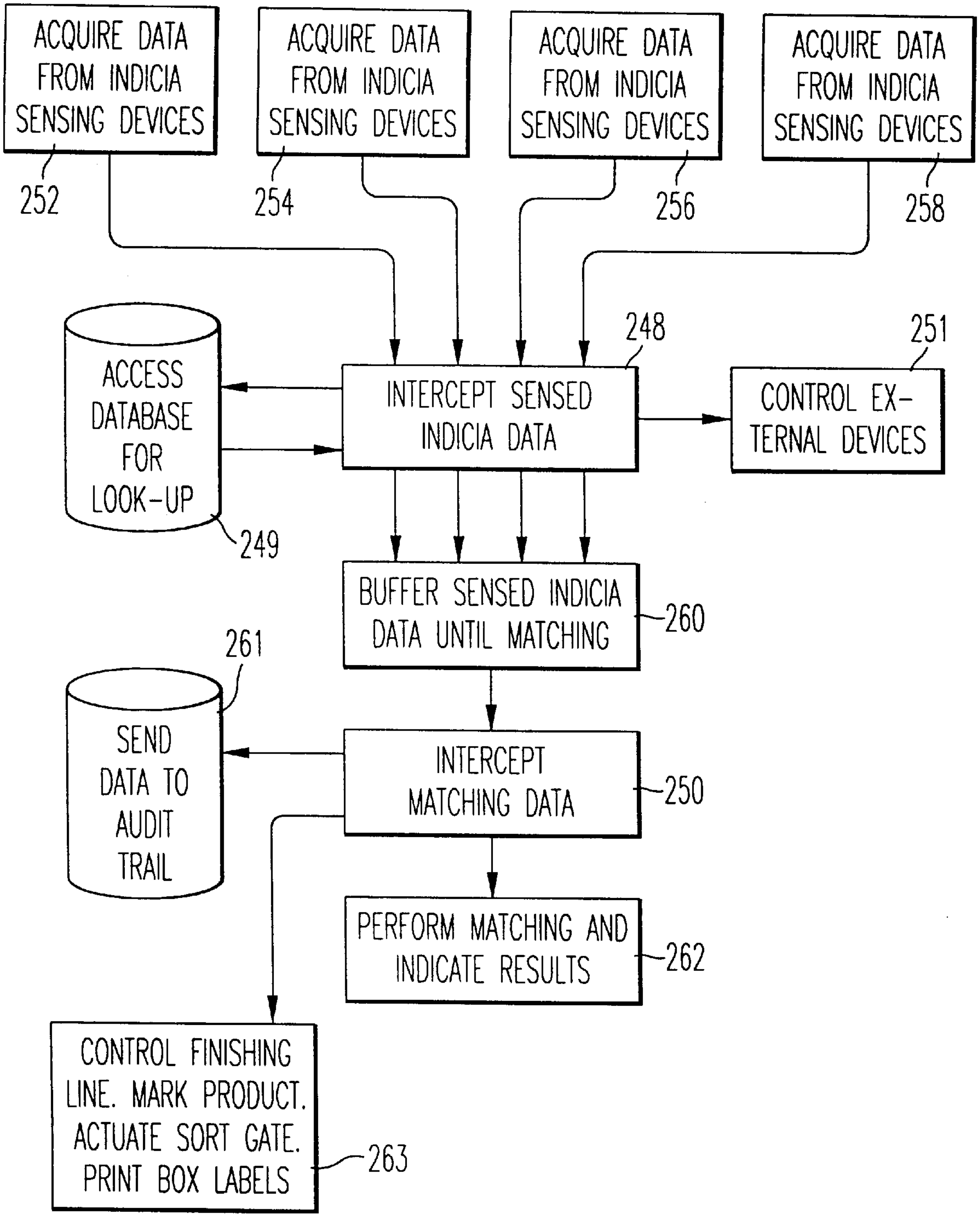
FIG. 8 is a block diagram illustrating points at which the data processing system of the present invention accesses the data stream illustrated in FIG. 7 in accordance with an embodiment of the present invention.

With reference to FIGS. 7 and 8, the blocks 252, 254, 256 and 258 represent the acquisition of data from each of a number of indicia sensing devices such as bar code scanners 110, 112, 114 and 116. The DPS 222 can access the scanned data at data tap 248 before the data from the indicia sensing devices is provided to the holding buffer 232 in the computer 182 (block 260). The DPS 222 can also access the data from the indicia sensing devices as it is stored in the holding buffer 232 and processed to determine whether the plies or other parts of a multiple-part printed product match (block 260), and before the results of the matching processed are indicated to an operator (block 262), using the data tap 250.

An advantage of having the data tap 248 between the raw data input devices (i.e., the indicia sensing devices) and the holding buffer 232 is that data on different plies, for example, need not be of the same type. If a first ply comprises a bar code, and a second ply comprises a person's name and no bar code, the DPS 222 can process the raw input data to convert the bar code to the person's name or the alphanumeric name to the corresponding bar code. The DPS 222 can be programmed to perform conversions such as mathematical conversions or, for example, table look-up operations using data in the database search engine 240 (block 249). Other exemplary DPS 222 operations include, but are not limited to, performing quality control checks on individual plies, analyzing registration marks, and providing control signals to external equipment such as machines for inserting labels or tags between plies based on the data imprinted on the plies (block 251). For instance, an insert on which a reminder is printed to reorder more of a particular form can be placed between the plies of every 2000th form.

An advantage of having the data tap 250 between the holding buffer 232 and the process of indicating the results of matching operations (block 262) is that a completely assembled form can be analyzed, as opposed to only individual parts as with data tap 248. Data can therefore be analyzed to protect against duplicate forms, to perform quality assurance checks, to create an audit trail (block 261), to communicate with a production printer to reprint a bad form, and to other finishing devices such as envelope printers (block 263), among other operations.

Figure 9A:
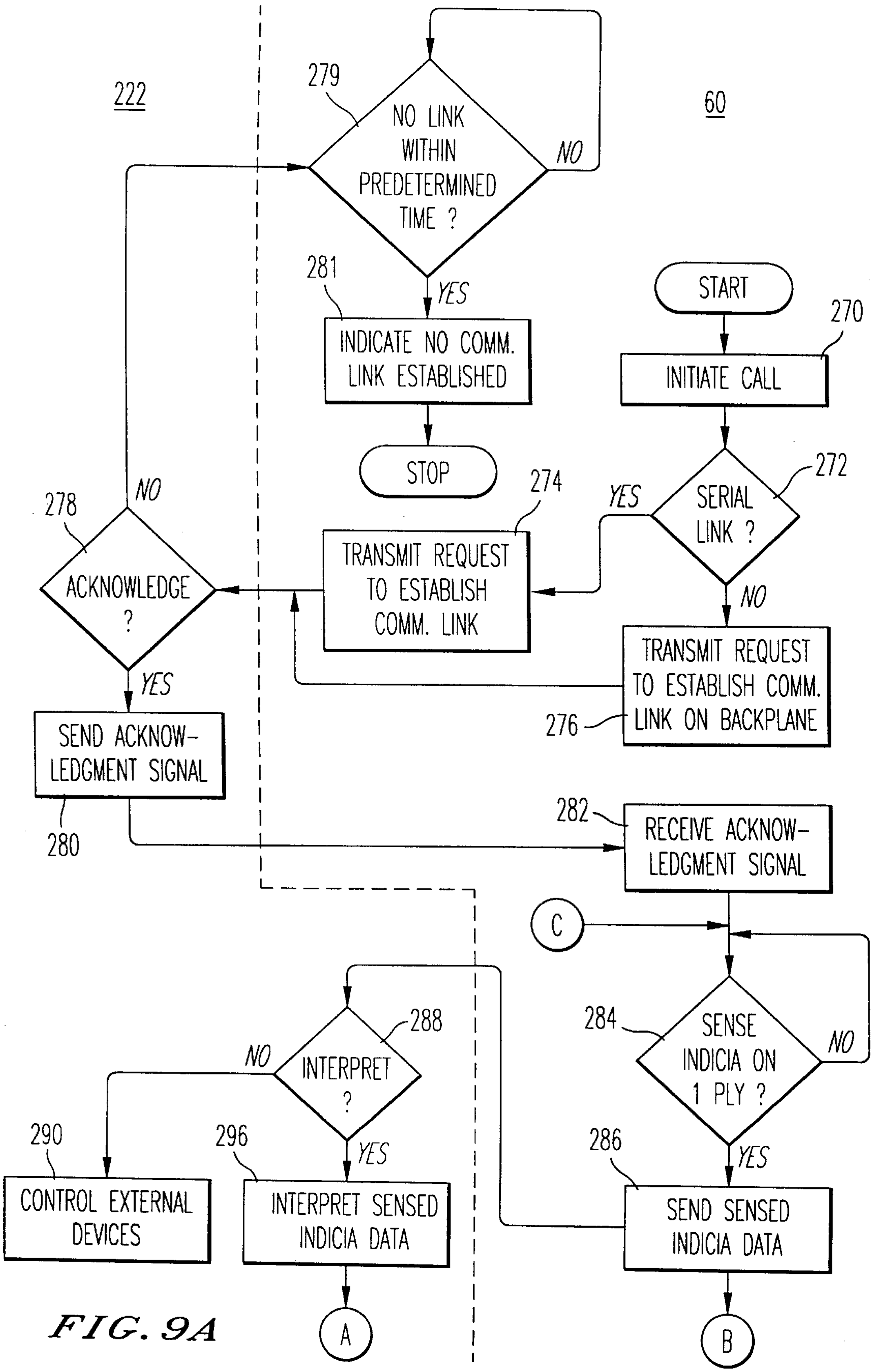
FIG. 9 is a flow chart depicting a sequence of operations for accessing a data stream generated by a matching/verification system using a data processing system constructed in accordance with an embodiment of the present invention.
Figure 9B:
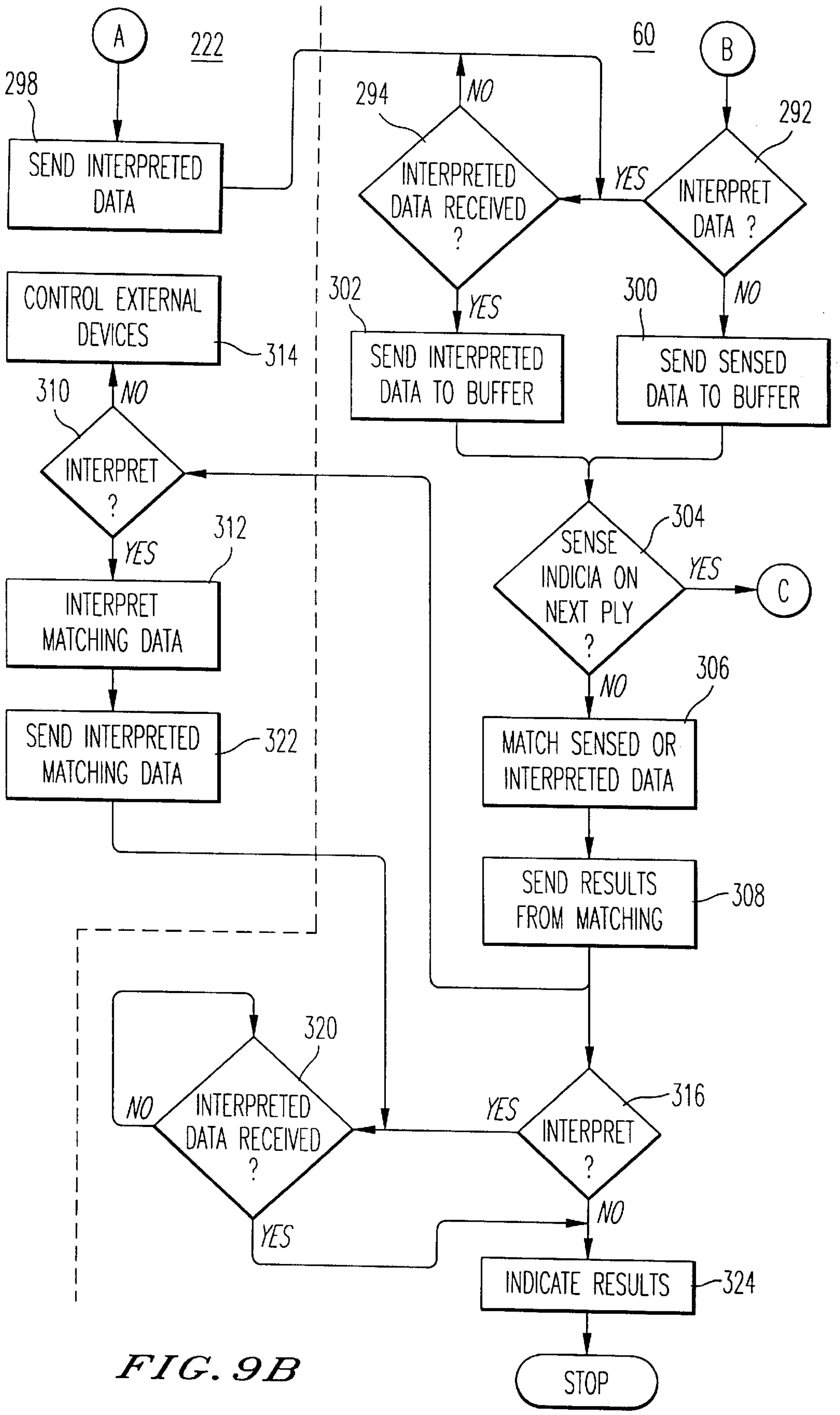

With reference to FIG. 9, the process of configuring a matching/verification system 60 to operate with a DPS 222 commences with the computer 182 initiating a call to a DPS 222 using the port address, memory address or network address available in the computer 182 configuration file (block 270). If the configuration file indicates a network address, the CPU 226 establishes a communication link with a remote DPS 222 via the communication interface circuit 242 (blocks 272 and 274). The computer 182 otherwise uses a port address to send a signal to a DPS 222 connected to the backplane of the computer 182 to request the establishment of a communication link (block 276). The DPS 222 is programmed to poll its input ports for interrupts and to determine if an incoming call is from a system 60 with which the DPS 222 is registered to operate (block 278). If the DPS 222 recognizes the signal, then the DPS 222 generates an acknowledgment signal and transmits it to the system 60 (block 280). The matching/verification system 60 is programmed to await receipt of the acknowledgment signal and to indicate a communication problem to on an operator if the acknowledgment signal is not received within a predetermined period of time (blocks 279 and 281).

Upon receipt of the acknowledgment signal (block 282), the matching/verification system awaits detection of indicia by one of the indicia sensing devices (block 284). Once the indicia is detected, the detected data is forwarded to the DPS 222 (block 286). In accordance with the present invention, the DPS 222 is programmed to determine whether or not the detected indicia is to be interpreted or used to control external devices (blocks 288 and 290). The computer 182 of the matching/verification system 60 is programmed to also know whether or not the sensed data is to be interpreted or passed as is (block 292). If the sensed data is to be interpreted by the DPS 222 (block 296), the matching/verification system 60 suspends use of the detected indicia (block 294) until it receives the interpreted data from the DPS 222. Data can be interpreted by performing the conversions described above in connection with block 249 in FIG. 8 (e.g., table look-up operations using the SQL server 240) If the matching/verification system determines that the detected indicia does not have to be interpreted by the DPS 222, as indicated by the negative branch of decision block 292, the detected data is forwarded to the holding buffer (block 300); otherwise, the matching/verification system 60 awaits for the data processing system 222 to send the interpreted data (block 298). The matching/verification system 60 then passes the interpreted data to the holding buffer (block 302). This process is repeated until all the necessary indicia sensing devices have forwarded their data and it has been stored as is or as interpreted by the DPS 222 into the holding buffer (block 304).

Once the data from all the indicia sensing devices has been stored in the holding buffer 232, a comparison can be made to determine whether or not the plies or parts of a multiple part form are correctly assembled (block 306). The results of the matching process in block 306 is forwarded to the DPS 222 (block 308). The DPS 222 determines whether or not the matching data requires interpretation (blocks 310 and 312) or can be used as is to control external devices (block 314). As stated above in connection with data tap 248, the matching/verification system 60 is programmed to know whether or not the matching or comparison data requires interpretation by the DPS 222 or is to be sent as is for further processing (i.e., to indicate the results of the matching process using indicators) (block 316). If the matching results require interpretation by the DPS 222, as indicated by the affirmative branch of decision block 316, the matching/verification system suspends operation using the matching results from block 308 until the interpreted results are received from the DPS 222 (blocks 320 and 322). The results are then indicated (block 324).

The computer 182 is programmed to provide the data processing system 222 with timing signals on a read-only basis. The data processing system 222 can therefore control external devices such as envelope printers and sorting devices in real-time with respect to the motion of the collator.

With regard to data tap 248, the data processing system 222 can be programmed to provide custom data messaging per particular customer requirements before the sensed data is passed to the holding buffer 232. The data processing system 222 can also actuate a number of external controls, such as a sprayer if a duplicate is detected or bar code quality is bad, to actuate an inserter to put another piece of the multiple printed product other than a ply, to perform data normalization or substitution, or to provide printer feedback signals (to control the printer to darken or lighten the indicia).

With regard to data tap 250, the data processing system 222 receives matched data indicating that form construction is complete and can control external devices based on the data itself or a referential relation of the data. For example, data can be provided to a printer to reprint bad data. An audit trail of finished goods can be created. Sequencing of forms per specific customer requirements can be tested for quality assurance.

Although the present invention has been described with reference to certain preferred embodiments, it will be understood that the invention is not limited to the details thereof. Various modifications and substitutions will occur to those of ordinary skill in the art. All such modifications and substitutions are intended to fall within the scope of the invention as defined in the appended claims.

What is claimed is:

1. A data processing system for use with a ply matching and verification system for multiple-part printed products, the ply matching and verification system comprising a number of sensors for detecting indicia on each of a plurality of parts constituting a multiple-part printed product assembled using a collator, and a computer for receiving, storing and processing output data from the sensors that corresponds to detected indicia to determine if all of the plurality of parts have corresponding indicia, the data processing system comprising:

a processing circuit; and a memory device connected to the processing circuit for storing program code and the output data;

wherein the processing circuit is programmed in accordance with said program code to establish a communication link with the computer, to receive the output data from the sensors via said communication link and to perform one of a plurality of operations comprising generating modified output data using the output data and forwarding said modified output data to the computer, and transmitting the output data unchanged to the computer, the computer being programmable to receive, depending on which of said plurality of operations said processing circuit performs, one of said modified output data and the output data via said communication link before processing said one of said modified output data and the output data to determine if all of the plurality of parts have corresponding indicia.

2. A data processing system as claimed in claim 1, wherein the computer comprises a computer bus, and said processing circuit is programmable to create said communication link by connecting to the computer bus.

3. A data processing system as claimed in claim 2, wherein the computer is programmed to store an address corresponding to said processing circuit and to initiate establishment of said communuication link by transmitting a signal to said processing circuit on said computer bus using said address.

4. A data processing system as claimed in claim 1, wherein the matching and verification system is equipped with a first communication interface circuit connected to the computer via a computer bus and said data processing system is remotely located with respect to the computer bus, said data processing system further comprising:

a second communication interface circuit connected to said processing circuit and to said first communication interface circuit to create said communication link, said communication link being selected from the group consisting of a hard-wired telecommunications link, a fiber optic link, a microwave link, a radio frqequency link, an infrared link, and an ultrasound link.

5. A data processing system as claimed in claim 4, wherein said computer is programmable to store an address corresponding to said data processing circuit and to initiate establishment of said communuication link by transmitting a signal to said processing circuit via said communication link using said address.

6. A data processing system as claimed in claim 1, wherein said processing circuit is a first processing device and further comprising at least one external control device selected from the group consisting of a sprayer, a sorter, a printer, a packaging device, a finishing device, a second processing device, an indicator, and a feeder, and connected to said processing circuit, said processing circuit being programmable to generate control signals for said external control device in accordance with the output data.

7. A data processing system as claimed in claim 1, further comprising a database engine connected to said processing circuit for accessing a database, said processing circuit being operable to receive the output data, to retreive selected data stored in the database and related to the output data, and to generate said modified output data using said selected data.

8. A data processing system as claimed in claim 1, wherein the computer is programmable to store said one of said modified output data and the output data in a buffer before processing to determine if the all of the plurality of parts have corresponding indicia, said processing circuit being programmable in accordance with said program code to establish a communication link with the computer to receive the contents of said buffer via said communication link, and to perform at least one of a plurality of operations comprising creating an audit trail relating to said printed product, transmitting at least part of the contents of said buffer to a printer connected to at least one of said processing circuit and the computer for reprinting a damaged one of said parts, controlling an external device connected to said processing circuit and selected from the group consisting of a sprayer, a sorter, a printer, a packaging device, a finishing device, a second processing device, an indicator, and a feeder in accordance with at least part of the contents of said buffer, and testing the integrity of indicia detection by the sensors in accordance with an operators specifications.

9. A data processing system for use with a ply matching and verification system for multiple-part printed products, the ply matching and verification system comprising a number of sensors for detecting indicia on each of a plurality of parts constituting a multiple-part printed product assembled using a collator, and a computer for receiving, storing and processing output data from the sensors that corresponds to detected indicia to determine if all of the plurality of parts have corresponding indicia, the data processing system comprising:

a processing circuit; and a memory device connected to the processing circuit for storing program code and the output data;

wherein the computer is programmable to store the output data from each of the sensors in a buffer before processing to determine if the all of the plurality of parts have corresponding indicia, said processing circuit being programmable in accordance with said program code to establish a communication link with the computer, to receive the contents of said buffer via said communication link, and to perform at least one of a plurality of operations comprising creating an audit trail relating to said printed product, transmitting at least part of the contents of said buffer to a printer connected to at least one of said processing circuit and the computer for reprinting a damaged one of said parts, controlling an external device connected to said processing circuit and selected from the group consisting of a sprayer, a sorter, a printer, a packaging device, a finishing device, a second processing device, an indicator, and a feeder in accordance with at least part of the contents of said buffer, and testing the integrity of indicia detection by the sensors in accordance with programmably variable specifications.

10. A method of processing output data in a ply matching and verification system for multiple-part printed products which is generated by a number of sensors for detecting indicia on each of a plurality of parts constituting a multiple-part printed product assembled using a collator, the method comprising the steps of:

intercepting the output data generated from a first one of the sensors prior to storage of the output data in a buffer by a first processing circuit until the output data from all of the sensors is received;

transmitting said intercepted output data to a second processing circuit;

determining which of a first operation and a second operation to perform using said second processing circuit depending on which of said first and second operations is specified in program code for said second processing circuit;

generating modified output data using said intercepted output data and forwarding said modified output data to the first processing circuit if said first operation is specified in said program code;

transmitting said intercepted output data unchanged to the first processing circuit if said second operation is specified in said program code;

receiving one of said modified output data and said intercepted output data at said first processing circuit depending on which of said first and second operations is specified in said program code;

storing said one of said modified output data and said intercepted output data in a buffer;

repeating the intercepting step, the step of transmitting said intercepted output data to said second processing circuit, the determining step, the generating step, the step of transmitting said unchanged intercepted output data to said first processing circuit, said receiving step and said storing step for the output data from each of the sensors; and processing said one of said modified output data and said intercepted output data to determine if all of the plurality of parts have corresponding indicia.

11. A method as claimed in claim 10, wherein said generating step comprises the steps of:

accessing a database using said second processing circuit;

retrieving selected data stored in said database depending on said output data; and substituting said retrieved data for said intercepted output data at said first processing circuit for determining if all of the plurality of parts have corresponding indicia.

12. A method as claimed in claim 10, further comprising the step of controlling at least one external control device connected to said second processing circuit using at least one of said intercepted output data and said modified output data.

13. A method as claimed in claim 10, wherein said processing step further comprising the steps of:

transmitting data generated during said processing step to said second processing circuit; and performing at least one of a plurality of operations using said second processing circuit, the plurality of operations comprising creating an audit trail relating to said printed product, transmitting at least part of the contents of said buffer to a printer connected to at least one of said first and second processing circuits for reprinting a damaged one of said parts, controlling an external device connected to said second processing circuit and selected from the group consisting of a sprayer, a sorter, a printer, a packaging device, a finishing device, a second processing device, an indicator, and a feeder in accordance with at least part of the contents of said buffer, and testing the integrity of indicia detection by the sensors in accordance with programmably variable specifications.

* * * * *